United States Patent [19]
Thrasher

[11] 3,964,151
[45] June 22, 1976

[54] TOOL FOR ADJUSTING MOTOR VEHICLE SUSPENSION SYTEMS, AND METHOD OF USING SAME

[76] Inventor: William N. Thrasher, 14205 Cantrell Road, Silver Spring, Md. 20904

[22] Filed: Aug. 8, 1975

[21] Appl. No.: 603,241

[52] U.S. Cl. .................................... 29/426; 81/55; 81/125
[51] Int. Cl.² ..................... B23P 19/00; B25B 13/02
[58] Field of Search .................. 29/426; 81/55, 125, 81/58.4, 53 R; 188/319, 285, 299

[56] References Cited
UNITED STATES PATENTS

| | | | |
|---|---|---|---|
| 2,394,355 | 2/1946 | Beecher | 188/319 |
| 2,507,266 | 5/1950 | Patriquin | 188/319 |
| 3,471,160 | 10/1969 | Sabo | 81/53 R |
| 3,889,558 | 6/1975 | Duncan | 81/55 |
| 3,916,734 | 11/1975 | Sawan | 81/55 |

*Primary Examiner*—James L. Jones, Jr.
*Attorney, Agent, or Firm*—Beal & Jeffery

[57] ABSTRACT

The invention relates to a tool for adjusting the shock absorption characteristics of a strut-type motor vehicle suspension system having a shock absorber with an axially extending piston rod for attachment to the vehicle chassis, the rod having a threaded outer surface and a shaped tip, the shock absorber characteristic being adjustable by rotating the rod about its axis while the shock absorber is fully depressed. The tool comprises a hollow sleeve for threadedly engaging at one end the end portion of the shock absorber rod when the rod end is detached from the vehicle chassis, an inner core for insertion into the sleeve and having a connector end for non-rotatably engaging the shaped tip of the rod end, and means for securing the sleeve and the core in relative non-rotational position and for permitting simultaneous rotation of the sleeve and the core. When the tool is connected to the rod end, the piston rod may be fully depressed and rotated along with the sleeve and the core to adjust the shock absorber characteristic. The method comprises the steps of detaching the rod end from the vehicle chassis, threading a sleeve on the outer surface of the rod end, inserting the core into the sleeve and engaging the core member with the shaped tip of the rod end securing the sleeve to the core, fully depressing and rotating the piston rod, and subsequently returning the rod end to its original position.

7 Claims, 5 Drawing Figures

TOOL FOR ADJUSTING MOTOR VEHICLE SUSPENSION SYTEMS, AND METHOD OF USING SAME

BACKGROUND OF THE INVENTION

1. Field of the Invention

The present invention relates to a tool for adjusting the shock absorption characteristics of a strut-type motor vehicle suspension system, and a method of using the tool.

2. Description of the Prior Art

A number of tools and adjusting wrenches have been disclosed in the past which permit adjustment of automotive components, such as engine tappets. Examples of such tools may be found in U.S. Pat. Nos. 1,957,905; 2,358,249; 2,566,543; 2,637,229, and 2,790,343. While such tools employ the basic concept of coaxially mounted nut and bolt engaging members, none of the potential devices is suitable for the present purpose of adjusting strut-type independent suspension systems. Moreover, to the best of my knowledge, there is no presently commercially available tool for adjusting the shock absorption characteristics of vehicle suspension systems, particularly on foreign built cars, without completely removing the shock absorber from its mounting.

SUMMARY OF THE INVENTION

Many modern automobiles utilize independent front and/or rear suspension systems which commonly have a shock absorber and coil spring assembly coaxially mounted in a single strut which attaches at its upper end to the chassis of the motor vehicle and at the lower end to a swing arm to which the wheel is fastened. While such suspension systems have superior performance characteristics, a serious problem is encountered when it is desired to adjust the shock absorption characteristics of the strut. Many of the embodiments presently used on mass-production automobiles require that the shock absorber be fully depressed and that the piston rod be rotated while the shock absorber is so depressed in order to modify the degree of shock absorption which results. The common practice has been to demount the entire strut from the automobile and then adjust the shock absorber. While this is an effective method of achieving the desired result, it has proven to be prohibitively expensive due to the amount of labor involved. The present invention comprises a tool for adjusting such suspension struts without removing the suspension struts from the vehicle, and method of using such tool.

The tool in accordance with the invention comprises a sleeve which is threaded on the inside at its lower end for engaging the upper end of the shock absorber piston rod which is threaded and which has a shaped tip. A core member is then inserted into the hollow sleeve and a connecting end on the core member engages the shaped tip of the piston rod end. The sleeve and core members may be secured together and the shock absorber fully depressed. By simultaneously rotating the sleeve and core members, the shock characteristic of the shock absorber is modified. The members may then be pulled upwardly, restoring the piston rod end to its original position. When the core and sleeve members are removed from the rod end the latter may be reattached to the vehicle chassis quickly and easily. The result is that a great deal of time and labor is saved by using the apparatus and method of the present invention.

DETAILED DESCRIPTION OF THE PREFERRED EMBODIMENTS

Figure 1:
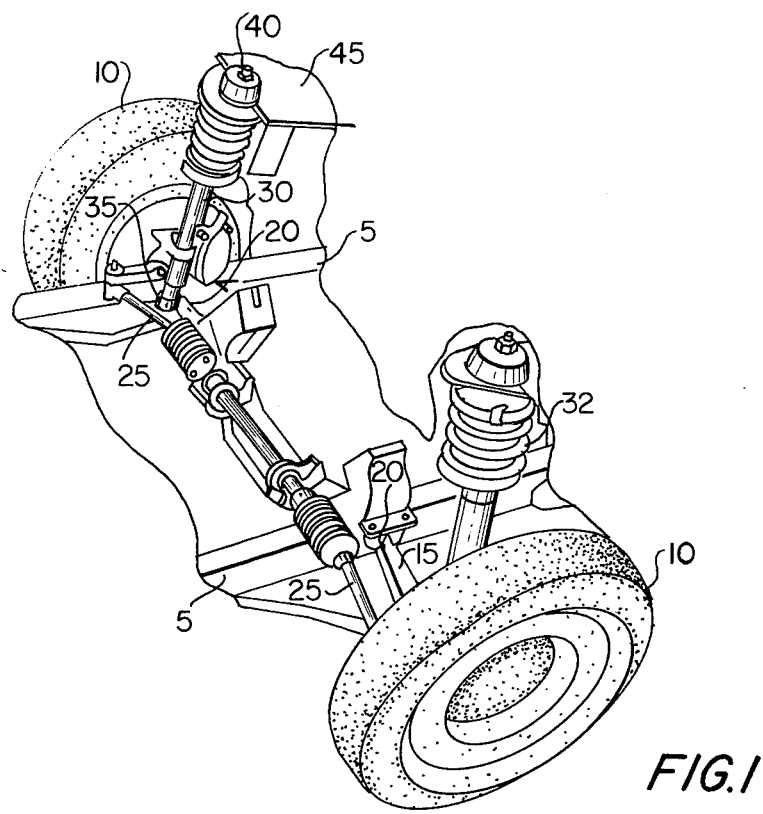
FIG. 1 discloses a cutaway view of an independent front suspension utilizing a MacPherson type strut.

In FIG. 1 is shown an independent front suspension system of a type commonly used in modern mass-produced automobiles. It is an extremely popular design due to the great simplicity of its layout, the minimum number of parts required, and the desirable handling characteristics. Vertical motion of wheel 10 relative to frame members 5 is permitted by the swing arm connection 15 which pivots at point 20. Steering linkages of the front wheels are shown at 25. To control the vertical motion of wheels 10, a strut 30 is provided at each wheel. Each strut has a shock absorber (not shown) coaxially mounted within a coil spring 32. The strut is fastened to swing arm 20 at the lower end thereof at point 35. The upper end of the shock absorber piston rod of each strut is threaded and mounted by nut 40 to sheet metal chassis panel 45. This type of front suspension system is commonly referred to as the MacPherson strut.

Figure 2:
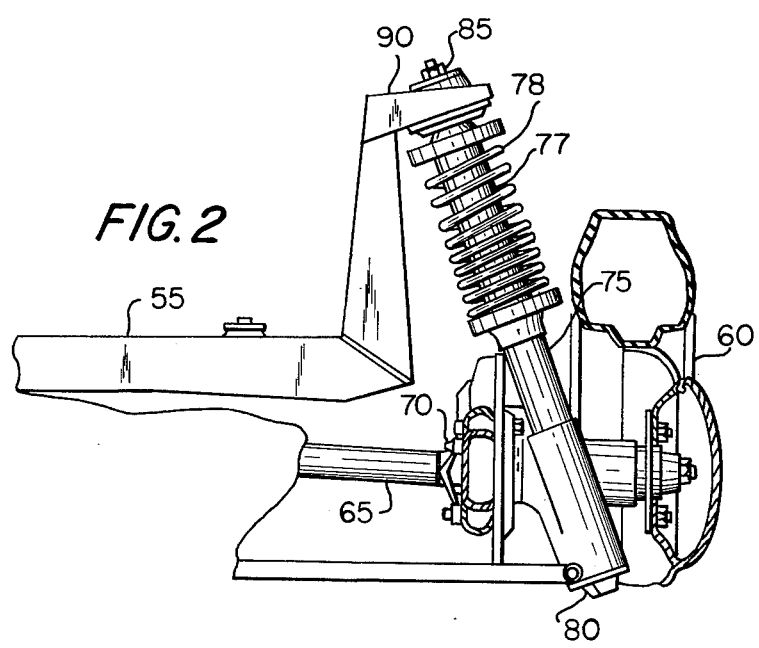
FIG. 2 illustrates an independent rear suspension system utilizing a Chapman type strut assembly.

The MacPherson strut was modified for use on an independent rear suspension vehicle and is commonly called the Chapman strut suspension system. This type of system is illustrated in FIG. 2. Rear frame member 55 supports a differential (not shown) to which the hub of wheel 50 is connected by a swing-axle 65 and pivot 70. Vertical motion of the wheel and swing-axle assembly is controlled by the spring-shock strut 75 connected at its lower end 80 to the hub assembly and at its upper end 85 to sheet metal chassis panel 90. As can be seen in FIG. 2, shock 77 is coaxially mounted within coil spring 78.

Figure 3:
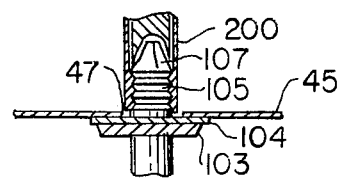
FIG. 3 illustrates an adjustable shock absorber and shows in part how the tool constructed in accordance with the present invention is used to effect adjustment.
Figure 3:
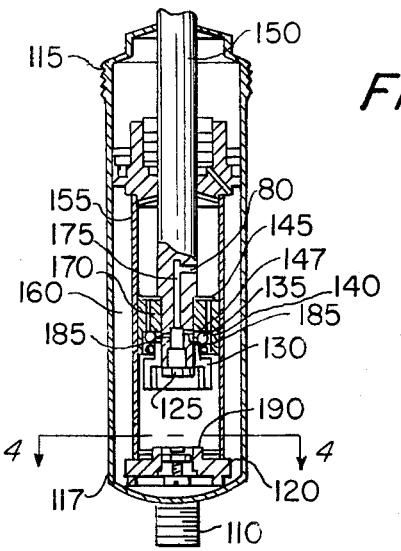

A cross-sectional view of a conventional adjustable shock absorber is shown in FIG. 3. The upper end 105 of shock absorber piston rod 150 has a flange 103 and a resilient washer 104 located beneath the chassis panel 45. In FIG. 3 the shock is shown with the upper mounting nut 40 removed and sleeve 200, which forms part of the adjusting tool constructed in accordance with the present invention, threadedly engaging the piston rod end 105. Rod end 105 has a shaped tip 107, which may be of generally rectangular sloped wall construction as shown or which may alternatively have a square, hex, slotted or otherwise shaped tip. The shock is commonly provided with a lower mount 110. It is to be understood that the lower mount may be of any conventional type and need not be of the type shown.

Figure 4:
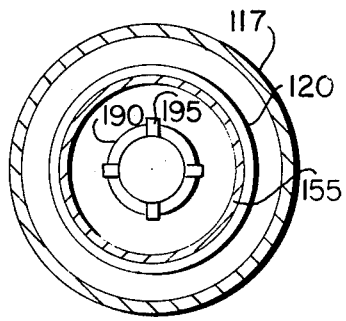
FIG. 4 is a cross sectional view of the shock absorber of FIG. 3 taken along line 4—4.
Figure 5:
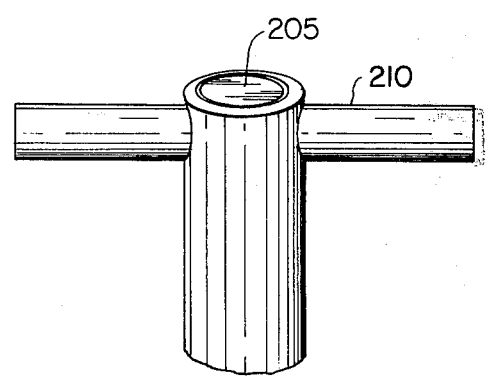
FIG. 5 shows an enlarged cutaway of the construction of the adjusting tool and its connection to the upper piston rod end.
Figure 5:
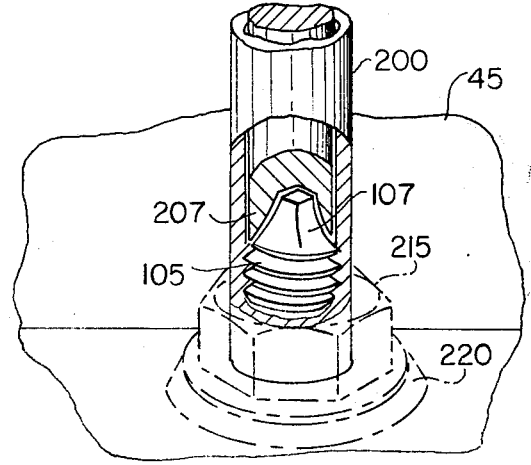

The shock absorber itself comprises shell 117, having a threaded outer portion 115 for receiving a coil spring retaining flange (not shown) and a piston 140 connected to the lower end of piston rod 150. The piston contacts the inner wall of a cylinder 155. Channels 170 and 175 restrict the flow of fluid through the piston as the piston rod moves up and down. Valves 145 and 147 serve to control the flow of fluid through channels 170 and 175 in dependence on the direction of piston travel. Excess fluid is held in reservoir 160 and valve assembly 120 controls the flow of fluid to and from the reservoir. Central channel 175 and an interconnecting channel 180 permit fluid to flow down to radial channels 185 which are located at different levels in the piston rod. An adjusting sleeve 130 is threadedly mounted on the end of the piston rod and is biased by a spring 135. Rotation of the adjusting sleeve relative to the piston rod causes more or less of the channels 185 to be opened, thus modifying the characteristic of the shock absorber. A slotted flange 190 is provided at the bottom of the cylinder so that when the piston and rod assembly is fully depressed, the slots 195 (FIG. 4) of the flange 190 will engage the lower portion of adjusting sleeve 130. It can thus be seen that by fully depressing the shock absorber and rotating the piston rod 150 relative to flange 190 and sleeve 130, the shock absorber characteristic may be made stiffer or softer. As above noted, the shock absorber shown in FIG. 3 is conventional and commercially available. FIG. 5 illustrates the adjusting tool of the present invention in an enlarged cutaway view. Normally, resilient washer 220 is mounted over the upper piston rod end 105 and secured to vehicle chassis member 45 by a nut 215. The washer and nut are shown in phantom view in FIG. 5. When it is desired to adjust the shock absorber, the nut and washer are removed and sleeve 200 is threaded over the end of the piston rod. A core member 205 is then inserted into the hollow sleeve, and connector end 207 of the core member non-rotatably engages the shaped tip 107 of the rod end, with the connector end 207 being formed with a recess 208 shaped to receive the tip 107 of the rod end. The sleeve 200 and core 205 are then secured together by a pin 210 or other means so that they will not rotate relative to one another. Pin 210 provides a convenient handle for rotating the sleeve, core, and piston rod relative to slotted flange 190. Sleeve 200 and core 205 are of sufficient length to permit the shock absorber to be fully depressed before pin 210 contacts chassis panel 45. It is to be noted that the outside diameter of sleeve 200 is small enough to easily pass through mounting hole 47 in the chassis panel. When the shock absorber is fully depressed and adjusting sleeve 130 has engaged slotted flange 190, the adjusting tool is rotated by pin 210 a desired amount, such as one-fourth or one-half turn. The shock absorber is then fully extended by the pulling upwardly on pin 210, after which the pin 210 is removed, and core 205 and sleeve 200 disengaged from the piston rod end. Washer 220 and nut 215 are then replaced and the automobile is ready for use.

The outer sleeve 200 is preferably constructed of tubular steel and the inner core 205 may be of either tubular steel construction or of solid rod. Pin 210 may likewise be either a steel tube or solid rod. Other suitable materials may of course be substituted.

It is to be understood that various modifications of the present invention may be made within the spirit and scope of the present disclosure. For example, pin 210 may be used to simply secure the sleeve to the core and rotational motion of the sleeve and core may be achieved by use of a separate handle connected to either the shaft or the core. The connector end of core 205 may be removable and replaceable with a different connector which would fit the shaped tip of a different brand of shock absorber.

I claim:

1. A tool for adjusting the shock absorption characteristics of a strut-type motor vehicle suspension system having a shock absorber with an axially extending piston rod end for attachment to the vehicle chassis, said rod end having a threaded outer surface and a shaped tip with the shock absorber characteristic being adjustable by rotating the piston rod about its axis while said shock absorber is fully depressed, comprising:

hollow sleeve means for threadedly engaging at one end the end portion of said piston rod when said rod end is detached from said vehicle chassis;

inner core means for insertion into said sleeve means and having a connector end formed with means for non-rotatably engaging the shaped tip of said rod end; and means for securing said sleeve means and said core means in relative non-rotational position and for permitting simultaneous rotation of said sleeve means and said core means, whereby said tool may be connected to said piston rod end for depressing and rotating said piston rod to adjust said shock absorber characteristic, the subsequent detachment of said tool and raising of said rod end permitting the latter to be re-attached to said vehicle chassis.

2. The tool of claim 1, wherein said securing means comprises a pin passing through said sleeve means and into said core means.

3. The tool of claim 2, wherein said pin extends radially outwardly from said sleeve means to provide a handle for rotation of said sleeve means and said core means.

4. The tool of claim 1, wherein said sleeve means further includes a radially extending handle for rotating said apparatus when said sleeve means is secured to said core means.

5. The tool of claim 1, wherein said core means further includes a radially extending handle for rotating said apparatus when said sleeve means is secured to said core means.

6. The tool of claim 1, wherein said connector end of said core means is detachable from said core means for replacement with a different connector end for engaging the shaped tip of a compatible piston rod end, whereby said tool may be used with more than one type of shock absorber.

7. A method for adjusting the shock absorption characteristics of a strut-type motor vehicle suspension system having a shock absorber with an axially extending piston rod having a rod end for attachment to the vehicle chassis, said rod end having a threaded outer surface and a shaped tip, the shock absorber characteristic being adjustable by rotating said piston rod about its axis while said shock absorber is fully depressed, comprising the steps of:

detaching said rod end from said motor vehicle chassis;

threading a hollow sleeve onto the outer surface of said rod end;

inserting a core into said sleeve and engaging a connector on the end of said core with the shaped tip of said rod end;

securing said sleeve to said core to prevent relative rotation therebetween;

fully depressing said piston rod and thereafter simultaneously rotating said sleeve, said core and said piston rod;

raising said piston rod to its original position;

removing said sleeve and said core from said rod end; and re-attaching said rod end to said motor vehicle chassis;

whereby said shock absorber characteristic is modified.

* * * * *